Figure 1:
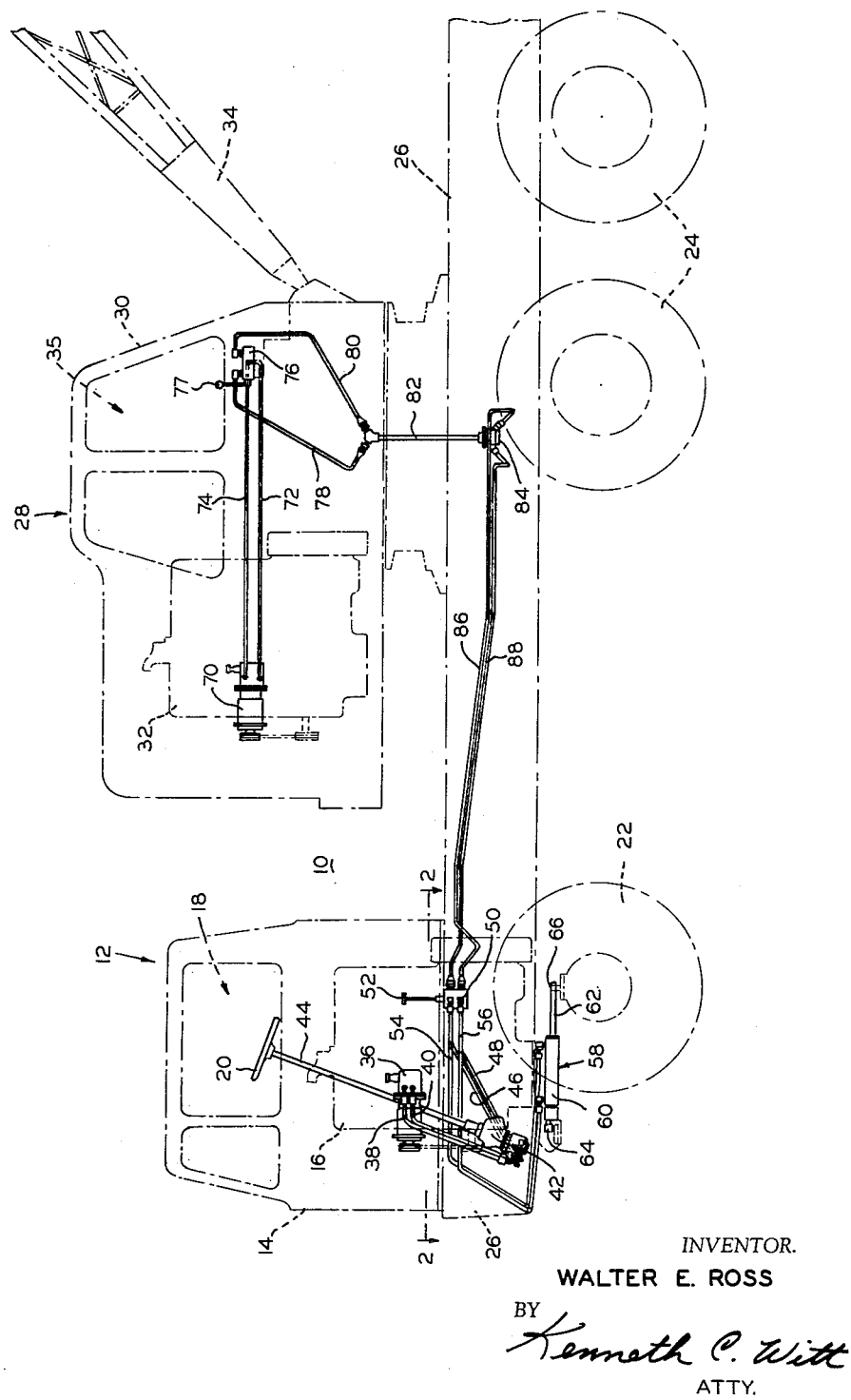

Sept. 19, 1961 W. E. ROSS 3,000,458
SELECTIVE STEERING MECHANISM
Filed May 23, 1957 2 Sheets-Sheet 1

INVENTOR.
WALTER E. ROSS
BY Kenneth C. Witt
ATTY.

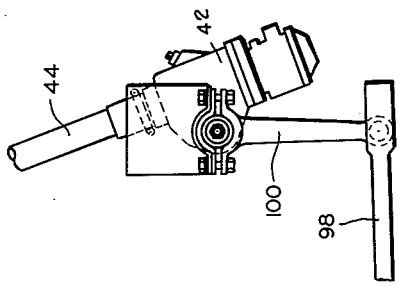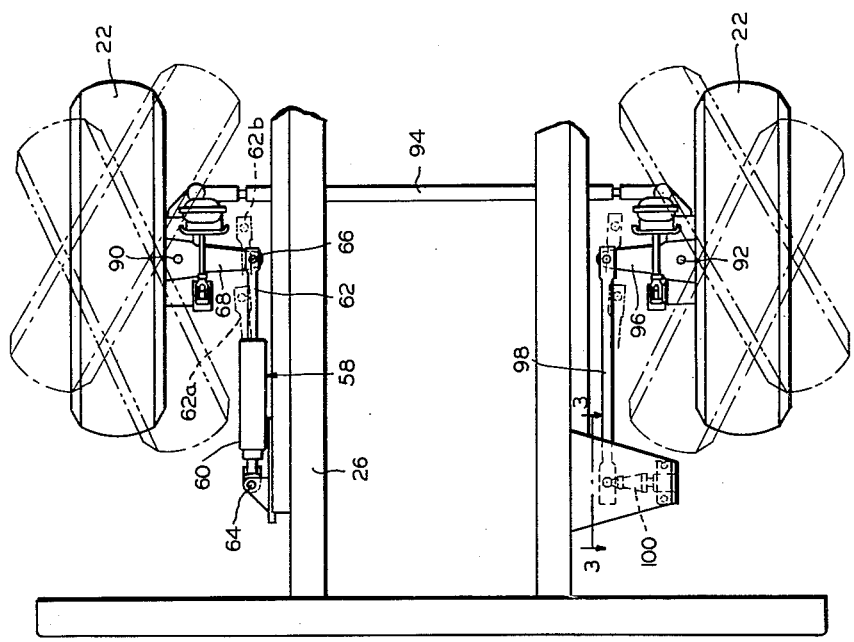

United States Patent Office 3,000,458
Patented Sept. 19, 1961

3,000,458
SELECTIVE STEERING MECHANISM
Walter E. Ross, Benton Harbor, Mich., assignor to Clark
 Equipment Company, a corporation of Michigan
Filed May 23, 1957, Ser. No. 661,182
4 Claims. (Cl. 180—79.2)

This invention relates to vehicle steering mechanisms which may be operated from either of two locations on the vehicle.

The present invention is particularly advantageous for embodiment in a so-called truck crane. This type of machine consists of a truck with a crane mechanism including a control cab mounted upon a rotatable platform on the rear portion of the frame of the truck. It will be recognized, however, that my invention is adaptable also for other types of vehicles which have more than one operator's station.

Various mechanisms have been used heretofore with truck cranes and other vehicles to provide selective steering from either the usual operator's station at the front of the truck or from another operator's station located elsewhere on the vehicle, such as in a rotatable crane cab near the rear thereof. Such mechanisms of the prior art of which I am aware, however, have been complicated and expensive.

It is the object of the present invention to provide a simple, inexpensive and readily manufactured selective vehicle steering mechanism.

In carrying out my invention in one form I provide a fluid actuator for turning or pivoting the dirigible wheels of the vehicle to steer it. A first fluid pump is operated by the main prime mover of the vehicle while a second fluid pump is operated by a prime mover in a crane cab near the rear of the vehicle. A steering valve operated by an operator's steering wheel in the main cab of the truck is arranged to admit the fluid from the first pump to the actuator through a transfer valve. When the steering wheel is turned the actuator turns the dirigible wheels of the vehicle. A second steering valve is provided in the crane cab to the rear and this is connected in a fluid circuit between the second pump and the transfer valve. When the transfer valve is in a second position the vehicle may be steered by moving the second steering valve to admit fluid from the second pump to the hydraulic actuator.

For a clearer and more complete understanding of my invention, reference should be had to the accompanying drawing, in which:

FIGURE 1 is a diagrammatic view of a preferred form of my steering mechanism superimposed upon a truck frame, FIGURE 2 is a top view of a portion of a typical truck crane embodying this invention, including the dirigible wheels and other parts as seen from line 2—2 in FIG. 1, and FIGURE 3 is a fragmentary sectional view along the line 3—3 of FIGURE 2.

Referring to FIGURE 1 of the drawing I have shown in phantom in dot-dash lines a typical truck crane vehicle with which the present selective steering mechanism may be used. The truck crane is indicated generally by the numeral 10 and includes a truck portion 12 having a forward or main cab 14 housing the usual prime mover 16 which ordinarily is an internal combustion engine. Cab 14 also houses an operator's station 18 which includes a conventional steering wheel 20. The truck includes a pair of front steering or dirigible wheels 22 (see FIGURE 2 for a view of both wheels) and tandem rear wheels 24.

Mounted on the rear of frame portion 26 of the truck is a rotatable crane mechanism indicated generally by the numeral 28. The crane mechanism includes a cab portion 30 which houses a second prime mover 32, also usually an internal combustion engine. The crane includes a boom portion 34 together with the necessary cables and other parts for providing operation of the crane, and the cab 30 houses the works and controls necessary for such operation. Also housed in cab 30 is a second operator's station 35 for operating the crane mechanism. By the use of the present invention the operator located in the crane cab may operate and steer the truck 14 from the crane cab.

It will be appreciated that the truck 14 includes all the necessary transmission, axle, and other mechanisms for operating drive wheels of the truck. The machine illustrated is arranged so that all of the truck wheels including the front dirigible wheels 22 may be driven for propelling the truck either by the first prime mover in the truck cab or by the second prime mover in the crane cab, although it will be appreciated that the present invention may be used for truck cranes having other drive arrangements of which several have been used.

The present steering mechanism includes a first pump unit 36 which is located in the main truck cab 14 and is driven by the first prime mover 16. Reference is made to a pump unit because device 36 in the mechanism illustrated, in addition to including a pump, also includes a small fluid reservoir and a relief or regulator valve which maintains the outlet pressure of the pump unit 36 at approximately a constant value regardless of the amount of fluid flow or lack of flow. The reservoir and regulator valve could, of course, be separate from the pump but combined units of this type are available and are convenient for use in steering mechanisms in accordance with the present invention. Hereinafter, unit 36 sometimes is referred to merely as a pump for sake of simplicity. Pump 36 is connected by a pair of conduits 38 and 40 to a steering valve mechanism 42 at the base of steering column 44 upon which steering wheel 20 is mounted. As illustrated, conduit 38 is the pressure conduit and conduit 40 the return line.

Steering valve mechanism 42 is connected by a pair of conduits 46 and 48 to a transfer valve mechanism 50. Transfer valve mechanism 50 preferably has an operating handle 52 which extends above the floor of the cab 14 where it is readily accessible to the operator in this cab. A pair of conduits 54 and 56 connect transfer valve 50 to a double acting piston and cylinder type fluid actuator 58. Actuator 58 includes a cylinder 60 and a piston (not visible) inside the cylinder which is mounted on a piston rod 62. Actuator 58 is pivotally connected at 64 to a projection on the front portion of frame 26 of the truck and at 66 to a lever 68. Movement of lever 68 pivots the right dirigible wheel of the vehicle to turn it the desired direction, and connections between the right and the left front wheels provide for the simultaneous turning movement of the latter wheel also.

It will be observed in FIGURE 2 that actuator 58 is located on the right side of the truck crane, although this is not apparent from FIGURE 1. FIGURE 1 is schematic and many parts of the vehicle have been omitted from this figure in order to simplify it. FIGURE 2, which is a view along the line 2—2 of FIGURE 1, shows a typical arrangement of some of the parts which provide for the turning or pivoting of the dirigible wheels, and it will be understood that some of the parts have been omitted from this figure also in order to simplify it.

The right front wheel 22 (top wheel in FIGURE 2) is pivoted about an axis 90 and the left (lower) front wheel 22 is pivoted about an axis 92. The movement of lever 68 pivots both of these wheels, the right wheel directly, and the other wheel through the medium of a conventional tie rod 94. I have illustrated by dot-dash lines in FIGURE 2 a full right turn for both wheels and I have also indicated in this view in dot-dash lines the retracted position of piston rod 62 which corresponds to this full right turn. The piston rod is labelled 62a in this retracted position for ready identification. A full left turn of the wheels and the corresponding position of the piston rod are indicated by dash-double-dot lines, and I have labelled the piston rod 62b in this position.

As the left (lower) wheel is pivoted about axis 92 it operates a lever 96 which in turn operates a rod 98 to provide a follow-up connection to steering valve mechanism 42. As shown by FIGURE 3, which is a fragmentary view along the line 3—3 of FIGURE 2, rod 98 acts through a lever 100 to tend to restore equilibrium in steering valve 42 so that the position of the dirigible wheels of the truck always correspond with the position of steering wheel 20.

A second pump unit 70 is mounted in the crane cab and is driven by the second engine. Pump 70 is connected by a pair of conduits 72 and 74 to a second steering valve 76 located at the operator's station in the crane cab. Steering valve 76 may be operated by a lever 77. From steering valve 76 a pair of conduits 78 and 80 lead to a two passage fluid connection 82 down through the center of the rotating connection between the crane cab and the truck frame. A suitable device 84 of known construction is provided at the bottom of connection 82 to allow rotation of tube 82 without escape of fluid. From device 84 a pair of conduits 86 and 88 lead to transfer valve 50.

When the transfer valve 50 is in one position fluid flows from pump 36 to actuator 58 during steering, while when the transfer valve 50 is in the other position fluid can flow from second pump 70 to actuator 58. This steering mechanism utilizes what is known as a closed system and when fluid flows into actuator 58 from a pump through one series of conduits it flows back through another series of conduits to the same pump.

If it is desired to steer the truck crane from the operator's station at the front of the truck, valve operator 52 on the transfer valve is moved to the proper setting. Then, with the main engine running to operate pump 36, if it is desired to steer the truck to the left the operator's steering wheel 20 is turned counterclockwise (as viewed by the operator facing forwardly in cab 14). This operation opens a valve in the steering valve mechanism 42 which admits fluid under pressure from line 38 to line 48, from which it passes through transfer valve 50 and through line 56 to the left end of cylinder 60. This causes actuator 58 to extend and pivot the dirigible wheels in the desired direction. During such operation fluid returns from the right end of cylinder 60 through conduit 54, transfer valve 50, conduit 46, valve 42 and conduit 40 to the pump 36. To steer the vehicle in the other direction from the main cab the steering wheel 20 is turned in the opposite or clockwise direction which causes a retracting movement of actuator 58 and steering to the right. During turning in this direction, fluid flows from valve mechanism 42 through conduits 46 and 54 to the right end of cylinder 60 and fluid returns through conduits 56 and 48 to valve 42 and then back to the pump 36.

When the operator wishes to steer the truck crane from the crane cab he merely moves operating handle 52 of the transfer valve to the other position. Then from his location in the crane cab he may operate valve 76 to admit fluid from the second pump 70 to the actuator 58 to steer the truck in the desired direction. As valve 76 is operated in one direction fluid is admitted from pump 70 through pressure line 74 to conduit 80, tube 82, fitting 84, conduit 86 and then through transfer valve 50 and conduit 56 to the left end of cylinder 60 to steer the vehicle to the left. Under these conditions fluid returns through conduits 54, 88, 82, 78 and 72 to pump 70.

Operation of valve mechanism 76 in the opposite direction admits fluid under pressure to line 78 from whence it passes through tube 82 and device 84 into line 88, then through valve 50 and conduit 54 to the right end of cylinder 60 to turn the dirigible wheels in the other direction. In this case the return is through conduits 56, 86, 82, 80 and 72 to pump 70.

To aid in understanding fully the present mechanism, it is pointed out that pump unit 36 circulates fluid continuously through pressure conduit 38, steering valve mechanism 42, and back through return conduit to the pumping unit, when prime mover 16 is operating. Similarly, whenever prime mover 32 is operating, pump unit 70 circulates fluid continuously through pressure line 74, steering valve 76, and return conduit 72. Whenever steering is desired from either operator's station, movement of the respective steering valve diverts fluid temporarily to the actuator 58. It will be appreciated that in the mechanism described and illustrated herein steering by means of wheel 20 is functionally the same as the conventional highway truck, i.e., the dirigible wheels of the truck turn in synchronism with steering wheel 20 because of the follow-up connection between actuator 58 and steering valve 42 previously described. Steering by means of lever 77 from the other operator's station is of the intermittent or on-off type. Movement of lever 77 in the desired direction admits fluid to one end or the other of cylinder 60 as long as the lever 77 is held in the actuated position; thus, the dirigible wheels 22 continue to turn as long as the lever is held in its actuated position, until the extreme position is reached. A spring is provided to restore lever 77 to neutral as soon as the operator releases it.

It will thus be seen that I have provided a steering system for a vehicle which is arranged for operation readily from either of two operator stations on the vehicle merely by operation of transfer valve 50 to the correct one of its two positions. This mechanism is simple and has proved to be reliable in actual operation, and is readily manufactured with the use of commercially available materials and components.

While I have illustrated and described herein a mechanism which employs hydraulic fluid as a steering medium it will be appreciated that my invention is not limited to such fluid but may employ air under pressure, vacuum or other equivalent mediums. A pair of generators could be substituted for the pumps, an electric actuator for fluid actuator 58, and suitable electrical switches and connections for the fluid valves and conduits, thus making the apparatus electrically operated if desired.

It will be apparent also that my invention is not limited to use with a truck crane vehicle but may be employed also on other vehicles which are required to have selective steering from more than one position on the vehicle.

While I have described and illustrated herein a preferred embodiment of my invention it will be apparent that modifications may be made, and I intend to cover by the appended claims all modifications which fall within the true spirit and scope of my invention.

I claim:

1. In a vehicle having a first prime mover and a first operator's station adjacent one end and a second prime mover and a second operator's station adjacent the other end thereof, a selective power steering mechanism comprising a first fluid pump operated by the first prime mover, an operator's steering wheel at the first operator's station, a piston and cylinder fluid acuator connected to turn the dirigible wheels of the vehicle, transfer valve means having two operating positions connected by fluid conduits to the said actuator, first steering valve means operated by the said steering wheel and connected by fluid conduits to the said transfer valve, fluid conduits connecting the said first pump with the said steering valve means whereby turning of the said operator's steering wheel when the said transfer valve is in a first of its two positions operates the said actuator to turn the dirigible wheels of the vehicle in the desired direction, a second pump driven by the second prime mover, second steering valve means located at the second operator's station, fluid conduit means connecting said second pump with said second steering valve means, and additional conduit means connecting said second steering valve means with the said transfer valve means whereby when the transfer valve is in its second position movement of the second steering valve means admits fluid from the said second pump to the said actuator for turning the dirigible wheels of the vehicle in the desired direction.

2. A selective power steering mechanism for a vehicle having a first prime mover and a first operator's station adjacent one end thereof and a second prime mover and a second operator's station in a rotatable cab adjacent the other end thereof, the power steering mechanism comprising a first fluid pump means operated by the first prime mover, said first pump means including first reservoir means and first regulating means for regulating the outlet pressure of the said first pump means, an operator's steering wheel at the first operator's station, first steering valve means operated by the said steering wheel and connected by pressure and return fluid conduits to the said first pump means, transfer valve means having two operating positions located at the first operator's station and connected by fluid conduits to the said first steering valve means, an hydraulic actuator connected to turn the dirigible wheels of the vehicle, fluid conduits connecting the said transfer valve means with the said hydraulic actuator, a follow-up connection between the said hydraulic actuator and the said first steering valve means, a second pump means driven by the second prime mover, said second pump means including second fluid reservoir means and second regulating means for regulating the outlet pressure of the said second pump means, second steering valve means located at the second operator's station and connected by pressure and return fluid conduits to the said second pump means, additional conduit means including a rotatable fluid connection connecting said second steering valve means with the said transfer valve means, whereby when the said transfer valve is in a first position the vehicle is steered by turning the said operator's steering wheel to operate the said first steering valve means and admit fluid to the said actuator and when the transfer valve is in its second position steering of the vehicle is accomplished by operation of the said second steering valve means to admit fluid from the said second pump means to the actuator.

3. A selective power steering mechanism for a vehicle having two operator's stations, comprising first fluid pump means including a reservoir located adjacent a first one of the operator's stations, first steering valve means at the first operator's station connected by pressure and return conduit means to the said first pump means, a fluid actuator comprising a cylinder and piston therein for turning the dirigible wheels of the vehicle, first conduit means connecting the said cylinder with the said first steering valve means and providing for the flow of fluid under pressure from said first pump means to either end of the said cylinder depending upon the direction of operation of the first steering valve means and the return of fluid from the opposite end of the cylinder to the first steering valve means and thence back to the first pump means, second fluid pump means located adjacent the second operator's station, second steering valve means at the second operator's station and connected by pressure and return conduits to the said second pump means, additional conduit means connected between the said second steering valve means and the said first conduit means whereby fluid under pressure may be admitted to either end of the said cylinder from the said second pump means and fluid returned from the opposite end of the cylinder back to the said second steering valve means and thence back to the second pump means, and transfer valve means located at the junction of the said first and second conduit means providing for the operation of the said fluid actuator to steer the vehicle only by the selected one of the said pumps and its connected steering valve means.

4. A selective power steering mechanism for a crane vehicle having dirigible wheels at one end and a first prime mover and a first operator's station adjacent the one end and a second operator's station in a rotatable cab adjacent the other end thereof, the power steering mechanism comprising a first unidirectional fluid pump operated by the first prime mover, a first reservoir for storing fluid and supplying it to the said first pump, a first fluid pressure regulator for regulating the output pressure of the said first pump, an operator's steering wheel at the said first operator's station, first steering valve means operated by the said steering wheel and connected by pressure and return fluid conduits to the said first pump and said first reservoir respectively, a transfer valve having two operating positions located adjacent the first operator's station and connected by fluid conduits to the said first steering valve means, a piston and cylinder type fluid actuator connected through a steering gear mechanism to turn the dirigible wheels of the vehicle, fluid conduits connecting the said transfer valve with the said fluid actuator, a follow-up connection between the said steering gear mechanism and the said first steering valve means, a second unidirectional fluid pump driven by the second prime mover, a second fluid reservoir arranged to store fluid and supply it to the said second pump, a second fluid pressure regulator for regulating the output pressure of the said second pump, second steering valve means located at the second operator's station and connected by pressure and return fluid conduits to the said second pump and the said second reservoir respectively, the said second steering valve means having two operating positions on either side of a neutral position and means normally biasing the same to the neutral position, a lever for operating the said second steering valve means additional conduit means including a rotatable fluid connection connecting the said second steering valve means with the said transfer valve, both of the said steering valve means being arranged so that when their respective prime movers and pumps are operating fluid circulates continuously from the pump through the steering valve means and back to the corresponding reservoir, whereby when the said transfer valve is in a first position and the first prime mover and the said first pump are operating the vehicle is steered by turning the said operator's steering wheel to operate the said first steering valve means to admit fluid through the said transfer valve to the said fluid actuator, the said follow-up connection causing the dirigible wheels of the vehicle to maintain continuously as long as the transfer valve is in its said first position a position corresponding accurately to the position of the said steering wheel, and when the said transfer valve is in its second position and the second prime mover and the said second pump are operating steering of the vehicle is accomplished by intermittent operation of the said steering lever to operate the said second steering valve means, such operation of the said second steering valve means admitting fluid from the second pump through the said transfer valve to the said fluid actuator and thereby turning the dirigible wheels in the selected directions as long as the said steering lever holds the second steering valve means out of its neutral position.

References Cited in the file of this patent
UNITED STATES PATENTS

| 2,512,119 | Stone et al. | June 20, 1950 |
| 2,674,333 | Zeilman et al. | Apr. 6, 1954 |